Figure 3:
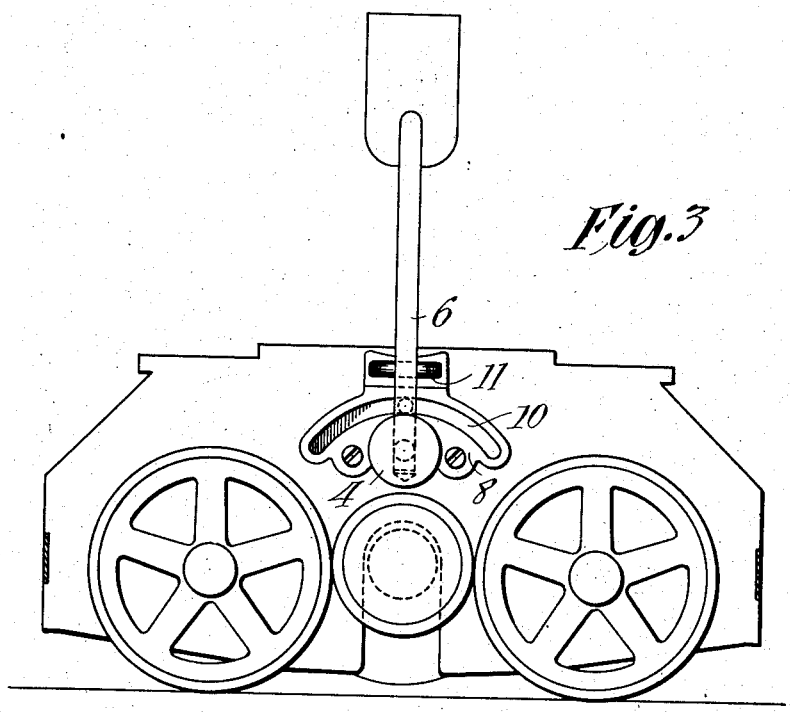

S. A. DAVIS.
CARPET SWEEPER.
APPLICATION FILED MAY 27, 1909.
1,010,871.
Patented Dec. 5, 1911.
2 SHEETS—SHEET 1.
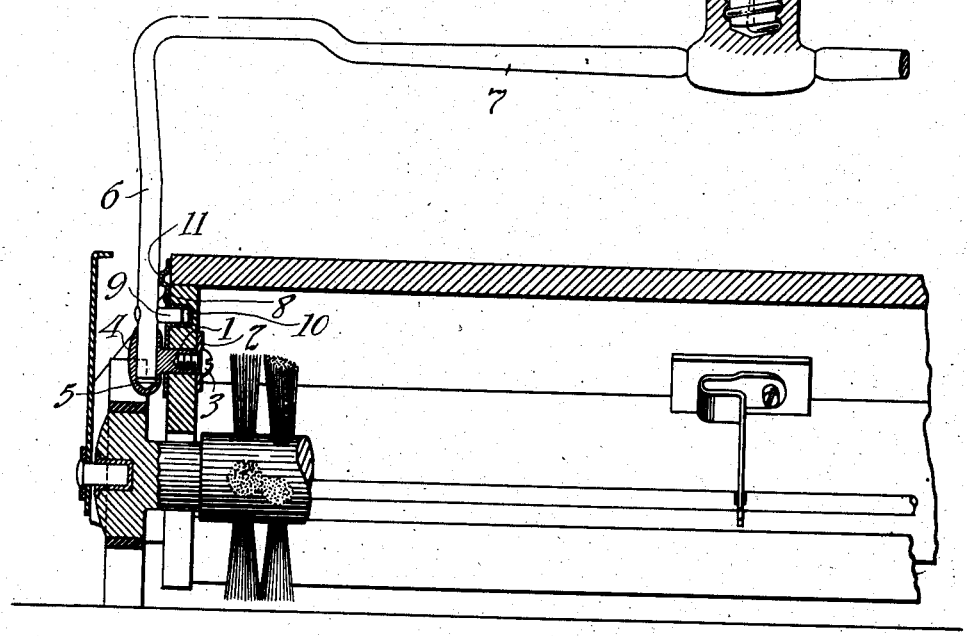
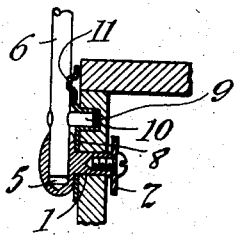
Witnesses:
Inventor:
Stephen A. Davis
by Herbert H. Dyke
Atty.

S. A. DAVIS.
CARPET SWEEPER.
APPLICATION FILED MAY 27, 1909.

1,010,871.

Patented Dec. 5, 1911.
2 SHEETS—SHEET 2.

UNITED STATES PATENT OFFICE.

STEPHEN A. DAVIS, OF NEWARK, NEW JERSEY, ASSIGNOR TO NATIONAL SWEEPER COMPANY, OF NEWARK, NEW JERSEY, A CORPORATION OF NEW JERSEY.

CARPET-SWEEPER.

1,010,871. Specification of Letters Patent. Patented Dec. 5, 1911.

Application filed May 27, 1909. Serial No. 498,651.

*To all whom it may concern:*

Be it known that I, STEPHEN A. DAVIS, of No. 154 Roseville avenue, in the city of Newark, county of Essex, and State of New Jersey, and a citizen of the United States, have made a certain new and useful Improvement in Carpet-Sweepers, of which the following is a specification.

My invention relates to carpet sweepers, and has for its principal object the improvement of the means of connection between the bail and the sweeper casing.

With this and related objects in view, my invention consists in the parts, combinations and improvements hereinafter set forth and claimed.

It is a well recognized fact that in order to prevent tipping of a carpet sweeper when in use, the pivotal connection of the bail to the casing should permit of longitudinal movement of the bail with respect to its pivot, and that the bail or some part connected therewith, as, for example, a stud upon the bail, should be so related to the casing that the turning of the bail upon its pivots will cause the bail to move in the direction of its own length with respect to the pivot. A device of this kind while sufficient to prevent tipping of the sweeper when being pushed and pulled back and forth over the floor will not present sufficient opposition to the rotation of the bail upon its pivots to enable the handle to be secured in any given position in which it may be desired to leave it, as for example, in the erect or substantially vertical position in which it is frequently desirable to leave the handle when the sweeper is momentarily out of use or when it is put away after using. In order to secure this result, it is necessary to provide projecting portions on some part of the sweeper casing which will frictionally contact with the bail and hold it in the desired position. This result can best be secured by arranging the projecting portions so that they will operate to spread the arms of the bail apart in opposition to their natural tendency to spring together, but when a carpet sweeper bail is equipped with the ordinary form of anti-tipping connection to the casing already described, it has hitherto been impossible to make use of such projections to hold the bail in a given position because the form of anti-tipping connection heretofore used would not permit the arms of the bail to spread apart.

For a more complete understanding of one form of construction in which my invention may be embodied, reference is hereby made to the accompanying drawings forming a part of this specification, in which the same reference numerals are used throughout for the designation of the same parts, and wherein—

Figure 1 is a longitudinal, central sectional view of a carpet sweeper in which the bail is connected to the casing in accordance with my invention. Fig. 2 is an enlarged detail of the bail connection shown in Fig. 1, and Fig. 3 is an end view of the carpet sweeper, with the wheel guard removed for clearness of showing.

In my improved device the connection between the bail and casing comprises a pivot member 1 which passes through an opening in the end of the casing provided for that purpose, and its inner end is provided with a head 2 which may be secured thereto by any convenient means such as the screw 3. The opposite or outer end of the pivot pin is enlarged so as to have the form of a knob 4 and this enlargement or knob is provided with an opening 5 which I prefer to have terminate just about the bottom thereof and which serves for the reception of the arm 6 of the bail or yoke 7 of the sweeper handle. This form of connection provides a pivotal support for the yoke or bail 7 upon the casing, and at the same time makes it possible for the bail to be moved longitudinally in the direction of the length of its arms 6. A metal reinforcing piece 8 is preferably secured to the exterior of the casing where the member 1 passes therethrough in order to secure a better support for the pin and for purposes which will hereafter appear. The distance between the head 2 of the pivot member and the knob 4 upon the opposite end thereof is somewhat greater than the distance through the end of the casing including metal reinforce 8, so that the arm 6 of the bail and with it the perforated knob 4 of the pivot member 1 may be moved toward and away from the end of the casing in addition to the pivotal and longitudinal movements of which the arm 6 is capable. Any convenient arrangement which will produce longitudinal movement of the arm 6 with relation to its pivot when the same is turned about the pivot so as to prevent the device from tipping may be made use of. In the drawings I have shown the construction which I deem to be preferable for this purpose, and the same comprises a projection or stud 9, upon the arm 6 of the bail, which enters a slot or groove 10 in the end of the sweeper casing and being preferably in the form of the arc of a circle which is eccentrically arranged with relation to the point of pivoting of the arm 6. Metallic walls are provided for the said slot 10 by stamping the reinforce 8 inwardly as will readily be understood from Figs. 1 and 3. This groove 10 is made relatively deep and the pin or stud 9 of great relative length so that the said pin will not be disengaged or withdrawn from the slot or groove by the outward motion of the arm 6 from the end of the casing which is permitted by the longitudinal movement of the member 1 therein.

Upon the end of the casing adjacent to the anti-tipping mechanism, which comprises the parts so far described, and in a position to hold the bail at whatever angle it is desirable, preferably in a vertical or upright position, the casing is provided with a projection the purpose of which is to thrust the arm 6 outwardly when the bail is turned upon its pivot, and as the device at the two ends of the sweeper are identical, the effect of these outstanding projections 11 is to spread the arms of the sweeper bail apart. This projection 11 may be formed in any approved manner but is preferably an integral part of the metal reinforce 8.

It will be seen that with the device constructed as above described, it is possible to lock the yoke and handle in any desired position, and that this locking is not interfered with by the anti-tipping connection of the handle yoke with the casing. It will be further seen that in addition to the yoke being locked in a vertical or other desired direction by means of its arms being spread apart by projections 11 against their inherent tendency to spring inward, the locking effect is increased by the fact that when the bail is turned to the desired position and is thrust outwardly by the projection 11 it is at the same time held inwardly by the head 2 on the pivot member 15, contacting with the inner surface of the end of the casing. The arrangement of the pivot pin with its head 2 and perforated knob 4 secures results which are highly beneficial. By forming the pivotal connection in this manner wear upon the parts in operation is distributed over relatively large surfaces and the pin and integral knob can be formed by casting, which insures strength together with extreme cheapness.

It will, of course, be understood that the construction heretofore described and shown in the drawings, as applied to one end of the carpet sweeper casing, is duplicated at the opposite end of such casing.

Having now described my invention, I claim:

1. In a carpet sweeper, the combination with a casing, of an apertured pivot member rotatable in said casing, the said casing being provided with a curved slot non-concentric with the axis of rotation of said pivot member, and a bail, the arm whereof is slidably received in the aperture in the said pivot member, and is provided with a stud adapted to enter said curved slot, substantially as set forth.

2. In a carpet sweeper, the combination with a casing, of an apertured pivot member rotatable therein and a bail, the arm whereof is slidably received in the aperture of said pivot member, and means whereby the turning of the bail causes longitudinal movement of the bail arm in said pivot member, substantially as set forth.

3. In a carpet sweeper, the combination of the casing, pivot members extending through apertures in the ends of the casing and provided with heads on their inner ends and knobs on their outer ends, the distance between the heads and knobs being greater than the thickness of the casing and the said knobs being provided with openings therein, a handle bail having arms entering the openings in the knobs and longitudinally movable therein, and means for causing the bail arms to move longitudinally in the openings of the knobs when the bail is rotated, substantially as set forth.

4. In a carpet sweeper, the combination with the casing, of pivoted members extending through apertures in its ends and provided with heads on their inner ends and knobs on their outer ends, the distance between the heads and knobs being greater than the thickness of the casing, the said knobs being provided with openings therein, a handle bail, the arms whereof enter the openings of the knobs, and studs on the arms, the casing being provided with curved slots eccentric to the axis of the pivot members on its ends which are entered by the said studs, substantially as set forth.

5. In a carpet sweeper, the combination of the casing, pivot members extending through apertures in the ends of the casing and provided with heads on their inner ends and knobs on their outer ends, the distance between the heads and knobs being greater than the thickness of the casing and the said knobs being provided with openings therein, a handle bail having arms entering the openings in the knobs and longitudinally movable therein, means for causing the bail arms to move longitudinally in the openings of the knobs when the bail is rotated, and means in the path of the bail arms when rotated for spreading the same apart, substantially as set forth.

6. In a carpet sweeper, the combination with the casing, of pivoted members extending through apertures in its ends and provided with heads on their inner ends and knobs on their outer ends, the distance between the heads and knobs being greater than the thickness of the casing, the said knobs being provided with openings therein, a handle bail the arms whereof enter the openings of the knobs, studs on the arms, the casing being provided with curved slots eccentric to the axis of the pivot members on its ends which are entered by the said studs, and means in the path of the bail arms when rotated for spreading the said arms apart, substantially as set forth.

This specification signed and witnessed this 22d day of May 1909.

STEPHEN A. DAVIS.

Witnesses:
 WILLIAM H. LEWIS,
 ARTHUR B. CHASE.